INVENTORS
ABRAHAM BROTHMAN
ALAN J. BRUCKNER
STEPHEN J. HALPERN
CONRAD YANIS

OSTROLENK, FABER, GERB & SOFFEN
ATTORNEYS

United States Patent Office 3,456,163
Patented July 15, 1969

3,456,163
REMOTE CONTROL OF ELECTRIC WATER
HEATERS
Abraham Brothman, Dumont, and Alan J. Bruckner, Bloomfield, N.J., Stephen J. Halpern, New York, N.Y., and Conrad Yanis, Glen Rock, N.J., assignors to Sangamo Electric Corporation, Springfield, Ill., a corporation of Delaware
Filed Dec. 16, 1966, Ser. No. 602,197
Int. Cl. H01h 47/32, 47/20, 51/32
U.S. Cl. 317—147          8 Claims

ABSTRACT OF THE DISCLOSURE

An electromechanical device for receiving an input of 60 cycles and subjecting the 60 cycle signal to full wave rectification in two separate branch circuits. In one branch circuit the signal is filtered and smoothed to substantially generate a D.C. voltage level which represents an averaging of the full wave rectified signal. The remaining unfiltered signal is subtracted from the D.C. voltage level and this difference signal is impressed upon a single gain amplifier, the output of which is fed to a frequency sensitive circuit whose output is coupled to a second amplifier stage to a relay driving stage. Operation of this relay shuts off the electric heater being monitored and thereby reduces load demands during peak hours.

---

The instant invention relates to control devices and more particularly, to a solid state control device for use in selectively energizing water heaters and the like under control of intelligence in the form modulated 60 cycle power frequency signal, which is the same signal employed for energizing such electric water heaters.

Large scale power distribution systems such as those within the domain of public and private electric utilities find it extremely advantageous to regular or "smooth" power demands throughout the year as well as throughout daily operation. It is well known that this is an extremely difficult objective to achieve due to the varying demands of power utility customers who, in turn, make the determination as to what their demands are during any given period, be it day, month, or year. Some typical examples are:

The peak power demands during the summer months typically occur within the hours from 5:00–7:00 p.m. in metropolitan areas due to the large number of home air conditioners placed into service. This is also typically accomplished with a demand for interior lighting during evening hours. In the case of heavy industrialized areas, the heavy equipment typically placed in service in the early morning hours at the start of a work day, likewise makes this a period of peak power demand.

Regardless of the reasons which contribute to peak power demands, it is most important that a utility try to achieve as smooth a power demand as possible during each twenty-four hour period in order to operate its equipment at maximum efficiency and thereby keep operating cost at a suitable level.

In power networks which provide electrical energy for a substantially large number of electric water heaters one method of compensating for increased power demands is that of taking all such electric heaters off the power lines during peak periods. This may be achieved by continuously metering power demands placed upon the system throughout the day; and using some control means to take the electric water heaters off the line as increased power demands are recognized. In typical power networks, it is not uncommon to find as many as 150,000 water heaters which may be so controlled by a single electric utility with the total number increased at the rate of 10–12,000 per year.

A number of methods have been proposed to provide such operation, some examples being:

(1) Providing a pilot wiring system to each heater. The installation cost of such a system based on estimates which have been taken is prohibitive;

(2) The use of carrier current on power lines. The loss of signal in capacitors within the system presents a large problem. Present systems have as many as 600 megavars with the potential increase of as many as 1300 megavars being expected over the next few years;

(3) The use of a low frequency signal in the 20–250 signal range. The generator costs for such a system are so high as to make this system prohibitive.

All of the above proposed solutions are not economically feasible at present levels of capability.

The instant invention relates to a solid state control circuit operative under control of intelligence impressed upon the power distribution network by means of modulating the 60 cycle power frequency at a predetermined rate. In addition to providing a control device have an "off" reliability of greater than 90% and on "on" reliability of essentially 100%, the cost of providing such circuits is quite low so as to make it an economically feasible approach.

The instant invention is comprised of an electromechanical device which further includes a solid state circuit for receiving the incoming 60 cycle power signal and subjecting the incoming signal to full-wave rectification in two separate branch circuits. One of the full-wave rectified signals undergoes filtering and smoothing to substantially generate a D.C. voltage level which represents an averaging of the full-wave rectified signal. The remaining full-wave rectified signal, in its unfiltered state is subtracted from the D.C. voltage level with the difference voltage level being impressed upon a single gain stage amplifier. The output of the amplifier is impressed upon a frequency sensitive circuit which is designed to couple its output through a second amplifier stage to a relay driving stage. The frequency sensitive circuit is responsive to the presence of a signal having a frequency of 20 cycles for this frequency signal being passed and all other frequency signals being attenuated. The persistence of the 20 cycle signal for a period of at least one second is sufficient to energize the relay driver circuit for the purpose of operating a relay which, in turn, shuts off the electric heater being monitored by its associated solid state circuit.

The electromechanical switch means is further comprised of a timing device which is provided with a continuously rotating timer wheel having a plurality of teeth spaced at 45 minute intervals around the timing wheel. A pivotally mounted arm is positioned with the free end thereof making sliding engagement with the periphery of the timing wheel and being biased into said engagement by suitable spring means. The pivotally mounted arm is mechanically coupled to switch means which are designed to disconnect the electric water heater from the power source each time the pivotally mounted arm is driven away from the center of the timing wheel due to sliding engagement of the pivotally mounted arm with one of the teeth provided on the timing wheel. Let it be assumed that the free end of the pivotally mounted arm making engagement with the timing wheel periphery is positioned intermediate to teeth of the timing wheel. If the incoming power is modulated in such a manner as to produce the 20 cycle signal and if this signal persists for at least one second the relay means will be energized to independently operate the switch means in order to turn off the electric water heater. As soon as the next tooth on the timing wheel engages the pivotally mounted arm, the electric water heater will again be turned on. Since the teeth of the timing wheel are spaced at 45 minute intervals the electric timing water heater can never be turned off for more than a maximum of 45 minutes. This arrangement thereby provides the necessary "on" reliability of essentially 100%.

The control signal is developed by reducing the amplitude of every third cycle of the power frequency signal at the electric utility generator location by approximately 1%, responsive to an indication of an increase in system power demand. The presence of this signal at the solid state control circuit causes the difference signal developed to be of a level sufficient to operate the gain stage of the solid state circuit between cut-off and conduction at a predetermined repetition rate. This output is then converted to a signal which substantially resembles a 20 cycle sinusoidal signal sufficient to sustain oscillations of the tuned circuit at the 20 cycle rate. The above circuit being substantially all solid state provides an extremely small compact package which further requires no additional power sources other than the power frequency signal itself for operation thereof and thereby yields an extremely economical and reliable controlled device.

It is, therefore, one object of the instant invention to provide a novel solid state circuit for controlling the energization of electric water heaters and the like.

Another object of the instant invention is to provide a novel solid state circuit for controlling the energization of electric water heaters and the like which is designed to take the device which it controls off line in response to a power frequency signal which has its signal amplitude reduced every third cycle.

Still another object of the instant invention is to provide a novel solid state circuit for controlling the energization of electric water heaters and the like which is designed to take the device which it controls off line in response to a power frequency signal which has its signal amplitude reduced every third cycle by means of developing a first output representative of the average value of the incoming power frequency signal taking the difference between the average signal and a full-wave rectified output of the incoming carrier signal and utilizing the difference signal to energize a slow-to-open relay means tuned to operate at substantially one-third the frequency of the power frequency signal.

Still another object of the instant invention is to provide a novel device for controlling the deenergization of electric water heaters and the like which is designed to take the device which it controls off line in response to a modulated power frequency and which further comprises timing means energized by a local source of energy for automatically placing the device being controlled back on line after a predetermined time interval.

These and other objects of the instant invention will become apparent when reading the accompanying description and drawings in which.

Figure 2:
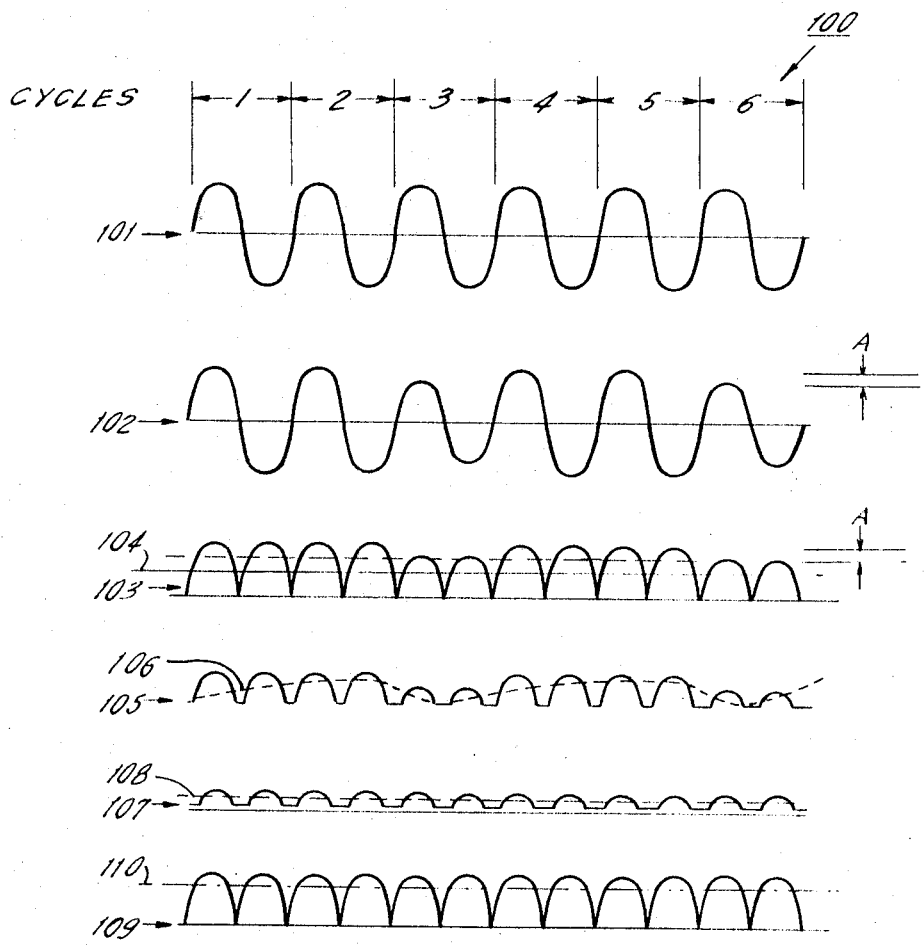
FIGURE 2 shows a family of waveforms provided for the purpose of describing the operation of the solid state circuit shown in FIGURE 1.

Referring now to the drawings, FIGURE 2 shows a family of waveforms 100 wherein the waveform designated 101 represents a typical 60 cycle power frequency signal normally generated by an electric generator which is employed by electric utilities. In the case where the power demands of a system supplied with power having an output represented by waveform 101, such an output will be maintained as long as there are no significant increased demands placed upon the system.

By any means (not shown) which the electric utility may employ to monitor system power demands, a significant increase demand may be identified. Responsive to such an increase power demand, the electric utility, automatically or otherwise, removes a small portion of the power generated by the reducing the amplitude of every third cycle of the power frequency signal generated. This, as shown by waveform 102 within cycles 1, 2, 4 and 5 of waveform 102, is substantially identical to the associated cycles of waveform 101 and wherein cycles 3 and 6 are reduced in amplitude by an amount A. While only 6 cycles have been shown in FIGURE 2, it should be understood that this is merely representative of the modulated waveform generated for the purposes of simplicity and any number of cycles may be generated in order to provide the desired operation of the solid state circuit to be susequently described.

Figure 1:
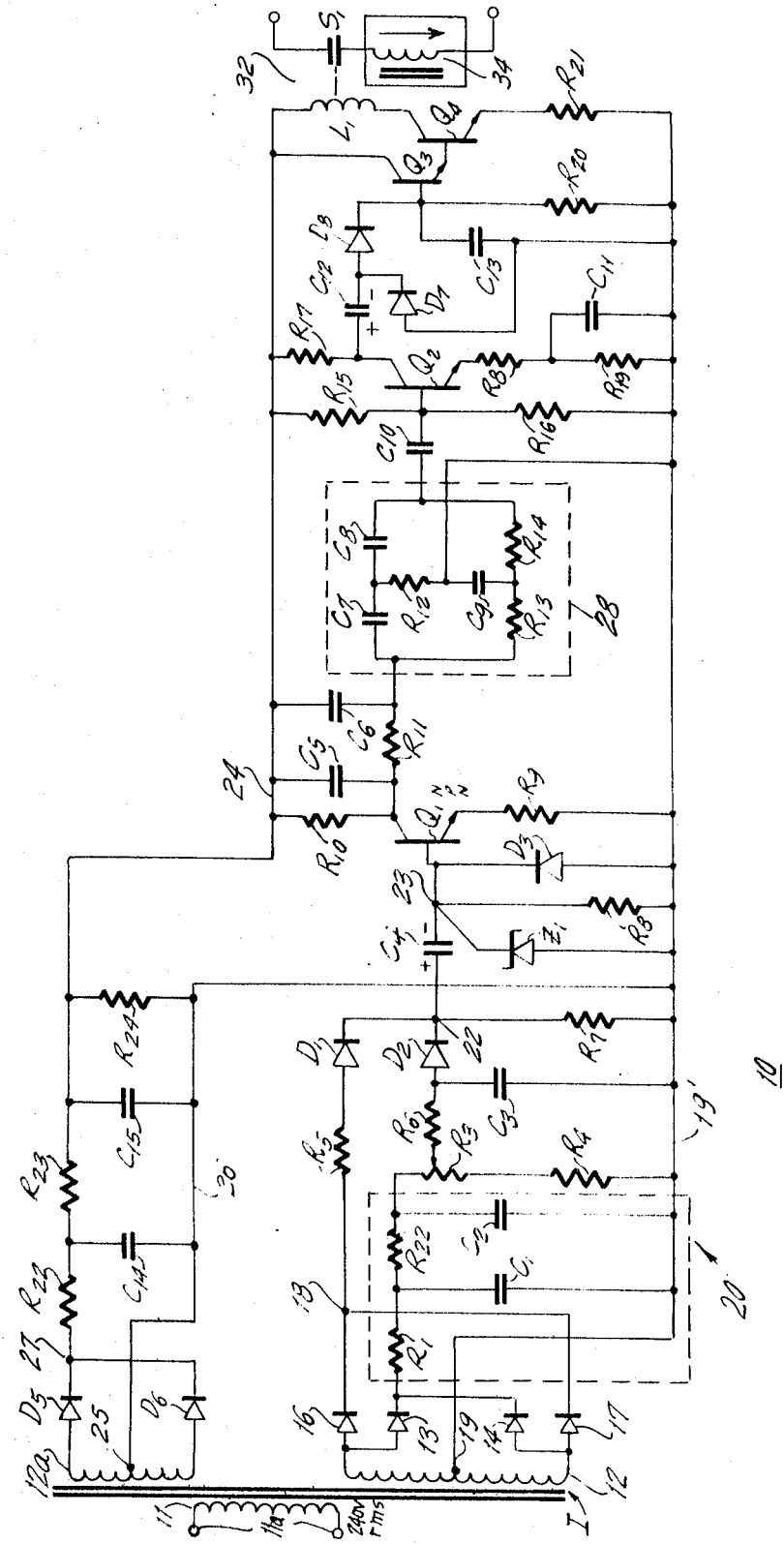
FIGURE 1 is a schematic diagram showing a heater control signal detector designed in accordance with the principles of the instant invention.

FIGURE 1 shows a heater control signal detector 10 designed in accordance with principles of the instant invention which is comprised of a transformer T having a primary winding 11 with a pair of input terminals 11a preferably for receiving a 240 volt 60 cycle power frequency signal. It should be understood that the amplitude and frequency rate of the input signal to the circuit 10 is merely one exemplary selection and the circuit of the instant invention can be operated to receive other frequency rates through appropriate design changes which are well within the capability of one having ordinary skill in the art.

One secondary winding 12a of the transformer T has a first full-wave rectifying circuit comprised of diodes 13 and 14 which are coupled to the secondary winding 12a in the manner shown in order to provide a full-wave rectified output at terminal 15. A second full-wave rectifying circuit comprised of diodes 16 and 17 are coupled to the secondary winding 12a in the manner shown to develop a full-wave rectified output signal at terminal 18 which is substantially identical to the output developed at terminal 15.

A filtering and smoothing circuit 20 comprised of resistors $R_1$ and $R_2$ and capacitors $C_1$, $C_2$ are coupled between terminal 15 and the center-tap 19 of secondary winding 12a for the purpose of generating a signal at terminal 21 which constitutes an average value of the full-wave rectified signal appearing at terminal 15. The voltage developed across the filtering and averaging circuit 20 and appearing between bus 19' and terminal 21 also appears across potentiometer $R_3$ and resistor $R_4$. The adjustable arm of potentiometer $R_3$ is coupled through resistor $R_6$ to one terminal of diode $D_2$. Capacitor $C_3$ coupled between common terminal to resistor $R_6$ and diode $D_2$ and the bus 19 further acts to filter at the output voltage.

The output terminal 18 of the second full-wave rectifying circuit is coupled to one terminal of a diode $D_1$ through resistor $R_5$. The opposite terminal of diode $D_1$ is coupled to terminal 22.

The potentiometer $R_3$ has a manually adjustable arm 23 for coupling some portion of the voltage developed across potentiometer $R_3$ to diode $D_2$ through resistor $R_6$. The resultant output at terminal 22 constitutes the difference between the portion of the voltage developed across potentiometer $R_3$ and the output of the second full-wave rectifying circuit. This difference is impressed upon the base of transistor $Q_1$ through capacitor $C_4$. Zener diode $Z_1$ acts to limit the maximum voltage drop between terminal 23 and bus 19'. Diode $D_3$ which is also coupled between terminal 23 and bus 19' prevents terminal 23 from going to a potential more negative than the potential level of bus 19'.

Returning to waveforms of FIGURE 2, let it be assumed that the system monitoring means (not shown) presently indicates a significant increase in power demand. In this case, the power frequency signal developed at the generator location (not shown) takes the form of waveform 102. This waveform is received at the input terminals 11a of transformer primary winding 11 and likewise appears in substantially identical form across output terminals of secondary winding 12. The waveform 102 is then full-wave rectified by the first and second full-wave rectifying circuits to develop a resultant output waveform 103 appearing at the output terminals 15 and 18, respectively. The amplitude difference A is still present comparing the peak amplitudes of the signals occurring during cycles 3 and 6 with the peak amplitude of the signals occurring during cycles 1, 2, 4 and 5.

The filtering and smoothing circuit 20 develops a substantially D.C. output level represented by the waveform 104 which has been superimposed upon the waveform 103 of FIGURE 2. The difference between these two outputs appears at terminal 22 yielding the difference waveform 105. It can be seen that the peak amplitudes of the signals occurring during cycles 1, 2, 4 and 5 are substantially greater than the peak amplitude of the signals developed during the cycles 3 and 6. The resultant signal having the wave-shape 105 is impressed upon the base of transistor $Q_1$ which forms the solid state circuit gain stage for the purpose of amplifying the incoming signal. The collector of transistor $Q_1$ is coupled to D.C. bus 22 through the parallel connected resistor and capacitor elements $R_{10}$ and $C_5$, respectively, which function in such a manner as to "smooth" the wave-shape 105 to produce a resultant waveform 106 which is shown superimposed upon the waeform 105 in FIGURE 2. The D.C. voltage level of bus 24 is provided by means of a secondary winding 12a of tranformer T which has its center-tap 25 coupled to bus 19′ by conductor 26. The two end terminals of secondary winding 12a are coupled to terminal 27 through diodes $D_5$ and $D_6$ which form a full-wave rectifier. Resistor elements $R_{22}$–$R_{24}$ and capacitor elements $C_{15}$ and $C_{14}$ act to filter and smooth the full-wave rectified signal in order to provide a substantially constant D.C. output to bus 24.

The output of the gain stage which appears at terminal 27 is coupled to a frequency sensitive circuit 28 comprised of capacitors $C_7$–$C_9$ and resistors $R_{12}$–$R_{14}$. The frequency sensitive circuit 28 is designed to pass the 20 cycle component of the output signal.

Examining the waveform 106 appearing at terminal 22 and which is shown in FIGURE 2, it can be seen that the waveform has a repetitive cycle which extends over the cycles 1, 2 and 3 of waveform 102, with the substantially identical cycle repeating itself during the time period occupied by cycles 4, 5 and 6 of waveform 102. It can thus be seen that the frequency or repetition rate of waveform 105 is substantially 20 cycles per second as compared with the frequency of the waveform 102 which is 60 cycles per second. This signal having a harmonic frequency component (as well as some higher harmonics) of substantially 20 cycles per second is impressed upon the base of transistor $Q_2$. Transistor $Q_2$ forms an additional gain stage which amplifies the incoming signal, developing its output at collector terminal 29. The output at collector terminal 29 is coupled through capacitor $C_{12}$ to diodes $D_7$ and $D_8$ and capacitor $C_{13}$ is coupled between the opposite terminals 30 and 31 of diodes $D_8$ and $D_7$, respectively. Terminal 30 is coupled to the base electrode of transistor $Q_3$ which has its collector electrode coupled to bus 24 and its emitter electrode coupled to the base electrode of transistor $Q_4$. Transistors $Q_3$ and $Q_4$ are coupled in such a manner as to form a Darlington emitter follower circuit which is characteristically recognized as being an excellent current amplifier. The advantage of using such a current amplifier lies in the fact that the collector of transistor $Q_4$ is coupled to the coil $L_1$ of relay 32 which is employed for the purpose of closing the normally opened switch contacts $S_1$ to close 240 volt D.C. circuit which is cut across the contacts $S_1$ of relay 32 and series connected "turn-off" solenoid 34. The "turn-off" solenoid 34, in turn, functions to shut off the electric water heater in response to the control signal previously described.

Figure 3:
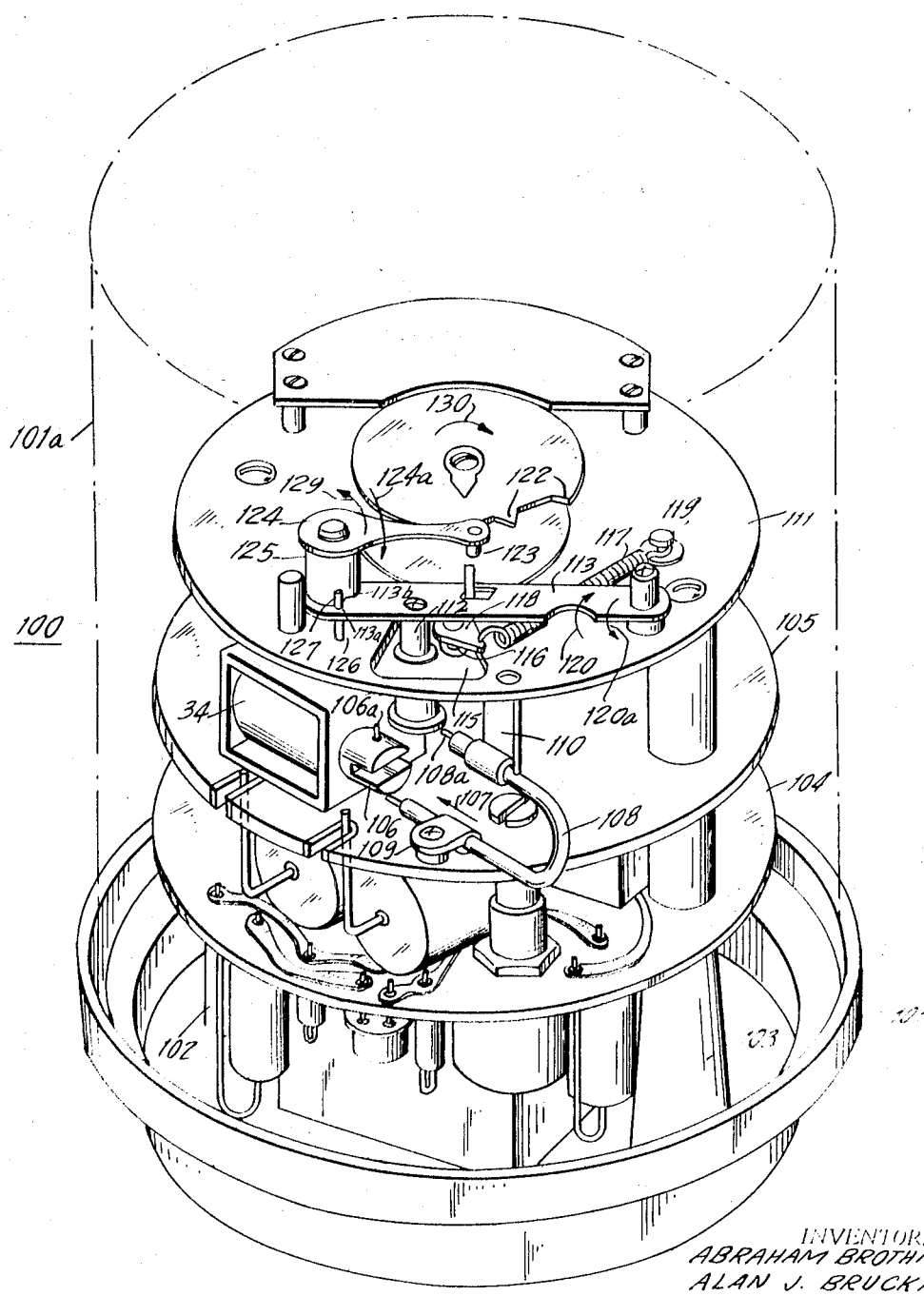
FIGURE 3 is a perspective view howing the remotely controlled water heater switch device employing the solid state circuit of FIGURE 1.

FIGURE 3 shows the remotely controlled water heater switch 100 which incorporates the turn-off solenoid 34 and solid state control circuit 10, shown in FIGURE 1. The remotely controlled water heater switch 100 is shown as being comprised of a circular base member 101, having suitable mounting posts 102 and 103 for stacking and rigidly securing the electronics package 10′, the electronics package 10′ being the soild state control circuit 10 of FIGURE 1. The electronics package 10′ is basically comprised of a substantially circular printed circuit board 104 having reactive and passive electrical components forming the circuit 10 being both physically and electrically connected to the printed circuit board. The second substantially circular disc 105 has the "turn-off" solenoid 34 secured thereto. Solenoid 34 is further comprised of a solenoid armature 106 designed to move in a direction shown by double-headed arrow 107. Armature 106 is provided with an opening 106a for receiving one end of a flexible cable member 108. The outer sheath of flexible cable 108 is rigidly secured to disc 105 by a clamping means 109 while the opposite end thereof is secured by clamping means 110 to the topmost disc 111. The opposite end of the cable 108′ within sheath 108 is coupled to pin means 112 at the lower end thereof. The upper end of pin means 112 is coupled to a lever 113 pivoted to rotate about post 114. Pin 112 is secured to a small plate 115 located at a position intermediate the ends of pin 112. Plate 115 is further provided with a pin 116 coupled to one end of spring means 117 to arm 118. The opposite end of spring means 117 is secured to post 119 mounted upon disc 111. It can clearly be seen from the drawing that spring means 117 biases arm 113 in a direction shown by arrow 120 to member 118, pin 116 through the coupling of spring means 117 to member 118, pin 116, plate 115, pin 112 and arm 113.

The switch assembly 100 is further comprised of timing means including a "turn-on" wheel 121 having a plurality of teeth 122 arranged at spaced intervals around wheel 121, with each tooth passing pin 123 provided at the free end of arm 124 at 45 minute intervals. Arm 124 is pivotally connected to circular disc 111 through pin means 125. The lower end of pin means 125 is provided with an arm 126 having an upwardly projecting ear 127 which cooperates with a pair of notches 113a and 113b at the free end of arm 113.

The operation of switch means 100 is as follows:

Let it be assumed that the incoming power signal has been modulated in order to turn-off the electric water heater, or other device being under control of switch means 100. The turn-off solenoid 34 becomes operative, driving armature 106 in a direction shown by arrow 107. The movement of armature 106 is coupled through flexible cable 108a ultimately to lever arm 113. The force of the armature 106 is sufficient to overcome the tension of spring 117 to rotate arm 113 in a direction shown by arrow 120a. The movement of pivotally mounted arm 113 frees ear 127 from notch 113a of arm 113. This enables arm 124 to rotate in a direction shown by arrow 129 and under control of suitable spring means (not shown) coupled to arm 124, for the purpose of urging the arm into counterclockwise rotation. This counterclockwise rotation repositions projection 127 against notch 113b provided in arm 113. This position is the "off" position since the movement of arm 124 in the counterclockwise direction is coupled (through means not shown) to the circuit for the electric water heater controlling it to be turned off.

The "turn-on" wheel 121 continuously rotates in the clockwise direction, shown by arrow 130. Eventually one of the teeth 122 will be urged against the pin means 123 provided at the free end of arm 124, driving it in the clockwise direction, as shown by arrow 124a. This rotates arm 126 and hence projection 127 causing the arm 113 to rotate to a small degree in the direction shown by arrow 120a until projection 127 moves out of engagement with notch 113b and into engagement with notch 113a. The clockwise rotation of arm 124 is utilized to turn "on" the electric water heater. Since the teeth 122 are spaced at 45 minute intervals around the timing wheel 121, it can be seen that the maximum period of time in which the electric water heater may remain in the "off" state is 45 minutes. It should be noted that 45 minute intervals are one preferred choice and any other time interval may be chosen, depending upon the needs of the user.

It should be understood that heater control signal detectors 10 are installed at each electric heater within the power distribution system and in the case where a system may have on the average of 150,000 such electric heaters, it can clearly be seen that removal of such a large number provides an accumulative effect of compensating for increased power demands of significant portions. Typically, the electric heaters are turned on and off in blocks of 25,000 at a time thereby affording compensated off-line conditions of different unit levels depending upon the number of blocks of water heaters placed on line or taken off line at any given instant.

It should be understood that when the system is in its quiescent state so that the power frequency signal has the wave-shape of waveform 101 in FIGURE 2, the full-wave rectified output appearing at both terminals 15 and 18 has the shape of waveform 109. After filtering and smoothing of the output at terminal 15, the substantially D.C. level appearing at terminal 21 is represented by the waveform 110 superimposed upon waveform 109 in FIGURE 2.

The full-wave rectified output appearing at terminal 18 combines with waveform 110 to form the difference waveform 107 of FIGURE 2 which resultant signal appears at terminal 22. The signal having the shape of waveform 107 undergoes amplification in the gain stage comprised of transistor $Q_1$. Frequency sensitive circuit 28 passes the D.C. cycle component of the signal to transistor $Q_2$ with the output thereof being utilized to control the relay driving transistor $Q_4$. Since no 20 cycle component is present, transistors $Q_3$ and $Q_4$ remain in cut-off state thereby preventing closure of contacts $S_1$. Thus, the electric heater, having once been turned on by timing wheel 121, remains on line.

In the case where a transient signal appears in the power circuit such as, for example, random noise, an impulse signal or a drop-out signal, the relay 32 will fail to operate due to its slow-to-close characteristic as well as the time constants of the capacitors $C_5$-$C_{13}$. Also, such transient conditions normally have a time duration which is substantially less than one cycle which is 1/60 of a second. Even assuming an output is developed at terminal 22, which is reasonably close to the 20 cycle waveform 106, its extremely short time duration would be insufficient to cause relay contacts $S_1$ to close.

It can therefore be seen that the instant invention provides a novel solid state heater control signal detector which is extremely reliable in nature due to the inherent reliability of its solid state components; it is extremely compact; and is low in cost, providing a very feasible solution to correct for increased power demands of a system, to enable an electric utility to "smooth" its power demands over daily, weekly or yearly time periods. Due to the design of the circuit, no independent power sources are required for the purpose of supplying the bias levels necessary for successful operation of the transistors $Q_1$ and $Q_2$. While the signal detector of the instant invention has been described as being capable of controlling the energization of electric heaters, it should be further understood that the detector of the instant invention is equally capable of controlling other electrically operated loads which may be serviced by an electric utility.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Signal detector means for use in controlling the connection of a source of electrical energy generating a substantially sinusoidal signal to a utilization device comprising first means for connecting said signal detector means to the source of electrical energy; second and third rectifying means each being coupled to said first means for full-wave rectifying the incoming signal; fourth means coupled to said second means for filtering and smoothing the rectified signal; fifth means coupled to said second and fourth means for generating a signal substantially equivalent to the difference between the signals generated by said second and fourth means respectively; sixth frequency sensitive circuit means coupled to said fifth means for passing a predetermined frequency and attenuating all other frequencies; relay means coupled to said sixth means for decoupling the utilization device from the energy source when the frequency of said averaged signal is substantially equal to the frequency at which said resonant means is tuned.

2. The device of claim 1 further comprising third full-wave rectifying means; said sixth means and said relay means being coupled to said third full-wave rectifying means to supply appropriate constant voltage bias thereto.

3. The device of claim 1 further comprising Zener diode means coupled between said fifth means and said sixth means for limiting the voltage level of the signal input to said sixth means by said fifth means.

4. The device of claim 1 further comprising adjustable potentiometer means coupled between said fourth means and said fifth means for impressing a portion of said fourth means output upon one input of said fifth means.

5. Signal detector means for use in controlling the connection of a source of electrical energy generating a substantially sinusoidal signal to a utilization device; said energy source being capable of reducing the amplitude of every third cycle of the output signal comprising first means for connecting said signal detector means to the source of electrical energy; second and third rectifying means each being coupled to said first means for full-wave rectifying the incoming signal; fourth means coupled to said second means for filtering and smoothing the rectified signal; fifth means coupled to said second and fourth means for generating a signal substantially equivalent to the difference between the signals generated by said second and fourth means respectively; sixth frequency sensitive circuit means coupled to said fifth means for passing one predetermined frequency component of said fifth means output and rejecting all others; relay means coupled to said sixth means for decoupling the utilization device from the energy source when the frequency of said averaged signal is substantially equal to the frequency which is passed by said sixth means.

6. Means for remotely controlling electrical water heaters and the like comprising:
  a remotely controlled switch means coupled to a source of energy for use in selectively decoupling a said source of energy from a utilization device comprising timing means comprised of a timing wheel having a plurality of spaced teeth around its periphery;
  first pivotally mounted means having one end thereof biased into sliding engagement with said timing wheel;
  a second pivotally mounted means engaging said first pivotally mounted means for holding said first means in a first position;
  said teeth being arranged to drive said first means from said first position toward a second position;
  said second means further comprising means for releasing said first means in said first position under control of one of said teeth and means for holding said first means in said second position;
relay means;
electronic control means responsive to a predetermined modulation of the waveform of said energy source for energizing said relay means;
said relay means comprising an armature coupled to rotate said pivotally mounted means for releasing said first means from said second position.

7. The device of claim 6 further comprising flexible cable means for coupling said relay means to said second means.

8. The device of claim 6 wherein said electronic control means is of the type described in claim 1.

References Cited

UNITED STATES PATENTS

| | | | |
|---|---|---|---|
| 3,098,179 | 7/1963 | Von Rossum et al. | 317—147 |
| 3,284,673 | 11/1966 | Shimada | 317—147 |

JOHN F. COUCH, Primary Examiner

R. V. LUPO, Assistant Examiner

U.S. Cl. X.R.

317—148.5